Aug. 15, 1950     J. GRAUSGRUBER     2,518,772
FISH FILLETING MACHINE
Filed June 7, 1947     2 Sheets-Sheet 1
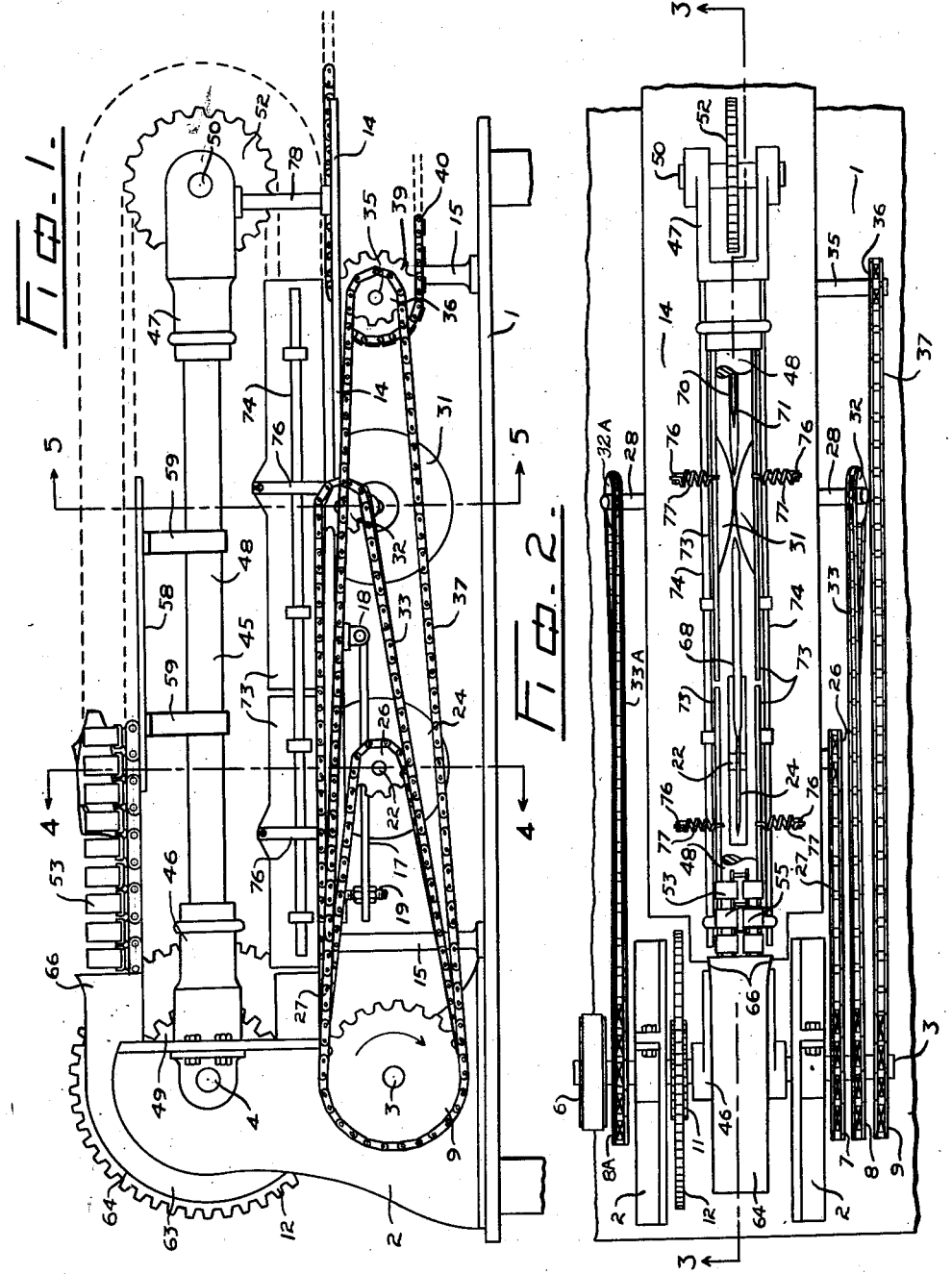
INVENTOR
JOHN GRAUSGRUBER
*Ernest F. Carver*
ATTORNEY

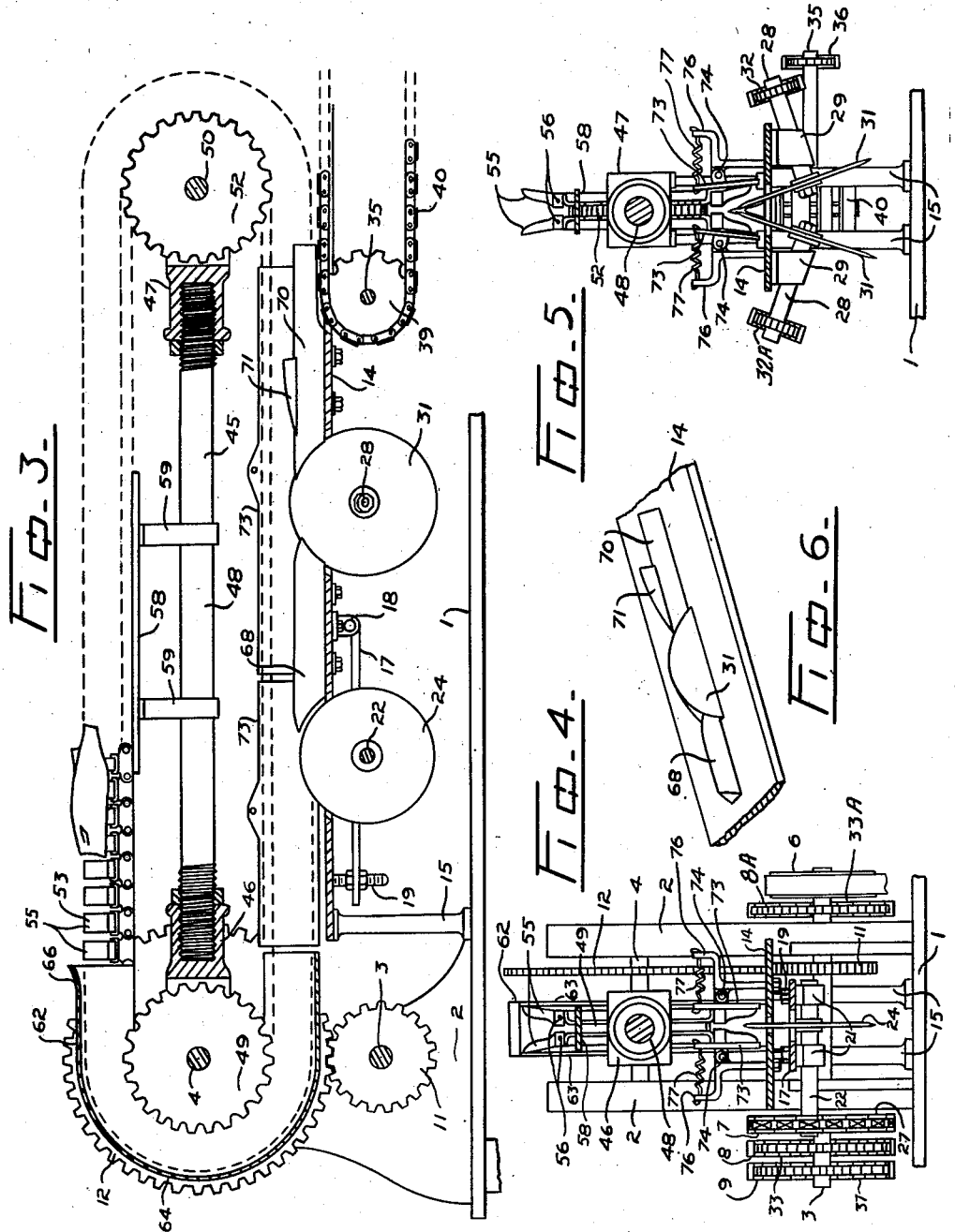

Patented Aug. 15, 1950

2,518,772

UNITED STATES PATENT OFFICE 2,518,772

FISH FILLETING MACHINE

John Grausgruber, Sherman, British Columbia, Canada

Application June 7, 1947, Serial No. 753,244

6 Claims. (Cl. 17—4)

My invention relates to improvements in fish filleting machines.

The object of the machine is to provide a simple means for slitting fish progressively, removing the entrails, subsequently removing the vertebra with the ribs attached and finally severing the fish longitudinally along the line of the dorsal fin to divide said fish into a pair of fillets. A further object of the invention is to provide a conveying structure for passing the fish over the several cutting elements, which structure is capable of being raised above the table to facilitate cleaning of the machines, sharpening of the cutting elements and general servicing.

The machine while being designed particularly for the filleting of herring and smaller fish, may obviously be used for larger fish of the same general shape.

Referring to the drawings—

Fig. 1 is a side elevation of the invention.

Fig. 2 is a plan view.

Fig. 3 is a longitudinal sectional view taken on the line 3—3 of Figure 2.

Fig. 4 is a transverse sectional view taken on the line 4—4 of Figure 1.

Fig. 5 is a transverse sectional view taken on the line 5—5 of Figure 1.

Fig. 6 is a perspective view showing the spreaders and the splitting knife.

In the drawings like characters of reference indicate corresponding parts in each figure.

The numeral 1 indicates a bed supporting a pair of spaced bearing plates 2 in which a main shaft 3 and a countershaft 4 are journalled. The main shaft 3 is fitted with a drive pulley 6, see Figures 2 and 4, a sprocket 7, chain sprockets 8 and 8A, a sprocket 9 and a driving pinion 11. The driving pinion 11 meshes with a gear 12 which is secured to the countershaft 4.

A work table 14 is carried upon standards 15 from the bed 1, which table gives support to the fish as it is being carried past the cutting elements to be hereinafter described. A slotted arm 17 is hinged at one end below the table 14, as at 18, and is adjustably supported at its free end by depending bolts 19 from the table. Below the slotted arm 17 bearings 21, see Figure 4, are provided to journal a transverse shaft 22, to which shaft a slitting knife 24 is secured, the said knife extending through the slot of the arm 17 and through an appropriate slot in the table 14. The shaft 22 is provided with a sprocket 26 which is driven from the sprocket 7 by a chain 27.

Intermediate the length of the table 14 a pair of inclined shafts 28 are journalled in bearings 29, see Figures 3 and 5, which are secured to the underside of said table, these two shafts are fitted at their inner ends with circular knives 31 whose upper edges run substantially in contact with each other and which project upwardly through the table 14 as shown in Figures 3, 5 and 6. A sprocket 32 is fitted to one of the shafts 28 and is driven by a chain 33 from the sprocket 8 on the main shaft 3 and a sprocket 32A is fitted to the other shaft 28 and is driven by a chain 33A from the sprocket 8A on the said main shaft.

A transverse shaft 35 adjacent the discharge end of the table 14 is driven through a sprocket 36 secured to said shaft and driven by a chain 37 surrounding the sprocket 9, the shaft 35 is fitted with a conveyor sprocket 39 to drive a conveyor chain 40.

Swingably mounted upon the countershaft 4 is a frame member 45 which consists of end forks 46 and 47 and a bar 48 threadedly engaging the forks. The fork 46 is journalled upon the shaft 4 on opposite sides of a sprocket 49, which latter is mounted on said shaft, and the fork 47 journals a shaft 50 having secured thereto a sprocket 52. A conveyor chain 53 is mounted upon the sprockets 49 and 52. The chain 53 which will hereinafter be referred to as the feed chain, is fitted with pairs of transversely disposed lugs 55 each of which are shaped on their inner faces to conform generally to the contour of the sides of a fish to be carried and gripped thereby, each link is pivotally mounted on a pin 56 extending parallel to the run of the chain 53 to permit it to swing to open position as shown in the upper run of the feed conveyor as in Figures 4 and 5 and to be closed about the body of a fish to the position as shown in the lower run of said Figures 4 and 5. To prevent the upper run of the feed chain 53 from sagging during the loading period, a horizontal bearer plate 58 is provided, which is carried upon supporting members 59 extending upwardly from the bar 48.

Mounted to surround the feed chain sprocket 59 is a C-shaped conduit 62, which is provided with side walls 63 and an outer wall 64. This conduit is of a cross sectional area to hold the lugs 55 of the feed chain 53 in closed position to grip any fish therein, but the entrance portion of said conduit is flared as at 66 to engage said lugs and move them from normally open to normally closed position as they enter said conduit.

Longitudinally disposed upon the table 14 are two spreaders generally indicated by the numerals 68 and 70, both are substantially A-shaped in cross section, the spreader 68 is of such transverse contour as to allow the circular knives 31 to engage a fish conveyed along the table on the outer side of the ribs of said fish. The spreader 70 is preferably slightly wider at its base than the spreader 68 and is provided with a vertical knife 71 which is adapted to extend upwardly through the fish above the vertebra position of any fish carried through the machine.

Extending from the discharge end of the conduit 62 to the discharge conveyor 40 are pairs of opposed cheek plates 73 which are rockingly mounted on a pair of horizontal rods 74, see Figures 1, 2, 4 and 5, which are carried on supports 76 from the table 14. The plates 73 are tensioned by springs 77 for the purpose of pressing their lower edges into contact with the outer face of the lugs 55 to cause them to firmly grip and support the fish being moved by the feed chain 53. A leg 78 is provided to support the free end of the frame member 45 horizontally when the feed chain is in operating position.

In operation, the fish from which the heads and tails have been removed, are placed on their backs between opposing lugs 55 of the feed chain 53, the placement taking place obviously in the upper run of said chain above the bearer plate 58. As each pair of lugs 55 enters the conduit 62 it is closed to grip the fish and carry it through said conduit and belly down onto the table. As a fish is carried past the circular slitting knife 24 the belly is cut open and the fish is slid onto the spreader 68 along which it is conveyed to the inclined circular knives 31 which enter the flesh of the fish just outside of the ribs and meet above the vertebra, thus removing them and allowing them to drop down between said knives, the fish is then passed on to the spreader 70 where the fixed knife 71 splits the remainder or the flesh of the fish into two complete fillets which are carried onto the conveyor 40 for ultimate packing. When filleting is completed, the free end of the feed conveyor is raised into inclined position, swinging about the countershaft 4, thus affording ample freedom for cleaning the several parts of the machine.

What I claim as my invention is:

1. A fish filleting machine comprising a table, a shaft mounted transversely adjacent one end of the table, an arm swingably mounted about said shaft, a sprocket secured to the shaft in alignment with the arm, a sprocket carried at the free end of said arm, an endless feed chain mounted upon said sprockets adapted to traverse the table longitudinally, said feed chain having a lower run along the table and an upper run above said table, articulated jaw-like fish engaging members carried by said chain, said members being adapted to open on reaching the upper run of the chain, means adjacent the first-named sprocket for closing the members to engage a fish after it approaches said sprocket, means extending parallel to and on opposite sides of the members for maintaining said members in fish engaging position when moving along the lower run of the chain, knife means for slitting the belly of the fish on being carried along the table, and a pair of rotary knives for subsequently removing the ribs of the fish.

2. A fish filleting machine comprising a table, a shaft mounted transversely adjacent one end of the table, an arm swingably mounted about said shaft, a sprocket secured to the shaft in alignment with the arm, a sprocket carried at the free end of said arm, an endless feed chain mounted upon said sprockets adapted to traverse the table longitudinally, said feed chain having a lower run along the table and an upper run above said table, articulated jaw-like fish engaging members carried by said chain, said members being adapted to open on reaching the upper run of the chain, means adjacent the first-named sprocket for closing the members to engage a fish, means extending parallel to and on opposite sides of the members for maintaining said members in fish engaging position when moving along the lower run of the chain, knife means extending above the table for slitting the belly of the fish on being carried along the table, and rotary knife means for subsequently removing the vertebra and the ribs of the fish.

3. A fish filleting machine comprising a table, a shaft mounted transversely adjacent one end of the table, an arm swingably mounted about said shaft, a sprocket secured to the shaft in alignment with the arm, a sprocket carried at the free end of said arm, an endless feed chain mounted upon said sprockets adapted to traverse the table longitudinally, said feed chain having a lower run along the table and an upper run above said table, articulated jaw-like fish engaging members carried by said chain, means on opposite sides of the chain adjacent the first-named sprocket for closing the members to engage a fish, means carried upon the table on opposite sides of the chain for maintaining said members in fish engaging position when moving along the lower run of the chain, stationary knife means extending above the table for slitting the belly of the fish on being carried along the table, and a stationary knife supported above the table for splitting the back of the fish subsequent to the removal of its ribs.

4. A fish filleting machine comprising a shaft, an arm mounted to swing about said shaft, a table extending below the arm, a member for normally supporting the arm in horizontal position, a sprocket mounted upon said shaft to rotate therewith, a sprocket carried adjacent the free end of said arm, an endless feed chain having fish engaging members driven by one of the sprockets, said fish engaging members comprising pairs of self opening pivotally mounted lugs adapted to stand in open position when occupying the upper run of the feed chain, a conduit having side walls supported to enclose the lugs when passing around the shaft and its sprocket, said conduit having an entrance wherein the side walls are outwardly flared, said flared walls adapted to engage the lugs of each pair to close them into fish engaging position, and fish cutting devices extending upwardly through the table for operating upon fish moved lengthwise of the table by said feed chain.

5. In a fish filleting machine, a table, an endless conveyor adapted to grasp a fish and move it belly side down along said table to be filleted, a circular slitting knife extending upwardly through said table adapted to slit the belly of a fish, a pair of spaced circular knives inclined towards each other above the table adapted to remove the ribs from the fish, means for rotating the several knives and an A-shaped member extending between the slitting knife and the rib removing knives to spread the flanks of the fish, said A-shaped member having side walls parallel to and slightly spaced from the adjacent knife portion above the table and to permit the ribs to pass through said spaces at the time of severance.

6. In a fish filleting machine, a table, an endless conveyor adapted to grasp a fish and move it belly side down along said table to be filleted, a circular slitting knife extending upwardly through said table adapted to slit the belly of a fish, a pair of spaced circular knives inclined towards each other above the table adapted to remove the ribs from the fish, means for rotating the several knives and an A-shaped member extending between the slitting knife and the rib removing knives, a second A-shaped member extending beyond the inclined knives to support the flanks of the fish after the separation of the ribs therefrom and a stationary knife extending above said second A-shaped member adapted to split the back of the fish.

JOHN GRAUSGRUBER.

REFERENCES CITED

The following references are of record in the file of this patent:

UNITED STATES PATENTS

| Number | Name | Date |
|---|---|---|
| 1,468,972 | Meissner | Sept. 25, 1923 |
| 1,861,863 | Hunt | June 7, 1932 |
| 2,140,575 | David et al. | Dec. 20, 1938 |
| 2,210,234 | Durand | Aug. 6, 1940 |